United States Patent
Davis et al.

(10) Patent No.: US 8,850,442 B2
(45) Date of Patent: Sep. 30, 2014

(54) VIRTUAL MACHINE ALLOCATION IN A COMPUTING ON-DEMAND SYSTEM

(75) Inventors: Adam Davis, Silver Spring, MD (US); Anjali Chati, Columbia, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 368 days.

(21) Appl. No.: 13/282,866

(22) Filed: Oct. 27, 2011

(65) Prior Publication Data
US 2013/0111468 A1 May 2, 2013

(51) Int. Cl.
*G06F 9/455* (2006.01)
*G06F 9/46* (2006.01)
*G06F 15/173* (2006.01)
*G06F 9/50* (2006.01)

(52) U.S. Cl.
CPC .................................. *G06F 9/5077* (2013.01)
USPC ............................... 718/104; 718/1; 709/226

(58) Field of Classification Search
None
See application file for complete search history.

(56) References Cited

U.S. PATENT DOCUMENTS

| | | | |
|---|---|---|---|
| 2007/0271560 A1* | 11/2007 | Wahlert et al. | 718/1 |
| 2009/0055834 A1* | 2/2009 | Ding et al. | 718/104 |
| 2009/0070771 A1* | 3/2009 | Yuyitung et al. | 718/105 |
| 2010/0211829 A1* | 8/2010 | Ziskind et al. | 714/48 |
| 2010/0269109 A1* | 10/2010 | Cartales | 718/1 |
| 2010/0293544 A1* | 11/2010 | Wilson et al. | 718/1 |
| 2011/0131571 A1* | 6/2011 | Heim | 718/1 |
| 2011/0154320 A1* | 6/2011 | Verma | 718/1 |
| 2011/0219372 A1* | 9/2011 | Agrawal et al. | 718/1 |
| 2013/0275977 A1* | 10/2013 | Uyeda et al. | 718/1 |

* cited by examiner

Primary Examiner — Abdullah Al Kawsar

(57) ABSTRACT

A method and system may receive a request to provision a virtual machine based on configuration information. Potential resources for hosting the virtual machine may be identified and scored. The scored potential resources may be ranked and an optimal resource for hosting the requested virtual machine may be selected based on the ranking. The requested virtual machine may be provisioned on the selected optimal resource.

24 Claims, 12 Drawing Sheets

OS CAPABILITIES TABLE 700

| | OS (704) | Edition (706) | OS Arch. (708) | MAX CPU (710) | MAX RAM (712) |
|---|---|---|---|---|---|
| 702-1 → | OS | Edition | OS Arch. | MAX CPU | MAX RAM |
| 702-2 → | Win 2003 SP2 | Standard | x86 | 4 | 4GB |
| 702-3 → | Win 2003 SP2 | Standard | x64 | 4 | 32GB |
| 702-4 → | Win 2003 SP2 | Enterprise | x86 | 8 | 64GB |
| 702-5 → | Win 2003 SP2 | Enterprise | x64 | 8 | 1TB |
| 702-6 → | Win 2008 | Standard | x86 | 4 | 4GB |
| 702-7 → | Win 2008 | Standard | x64 | 8 | 32GB |
| 702-8 → | Win 2008 | Enterprise | x86 | 8 | 64GB |
| 702-9 → | Win 2008 | Enterprise | x64 | 8 | 1TB |
| 702-10 → | Win 2008 Japanese | Enterprise | x64 | 8 | 1TB |
| ⋮ | ⋮ | ⋮ | ⋮ | ⋮ | ⋮ |
| 702-n → | Win 2008 R2 | Enterprise | x64 | 8 | 2TB |

FIG. 7

VM CLUSTER LIMITS TABLE

PHYSICAL DEVICE CAPABILITIES TABLE

FIG. 9C

ALLOCATED CLUSTER TABLE (950)

| ClusterName (952) | Allocated RAM (954) | Allocated vCPU (956) | Allocated VMs (958) | Allocated VMDK (960) |
|---|---|---|---|---|
| Cluster1 (951-1) | 292 GB | 168 | 94 | 133 |
| Cluster2 (951-z) | 114.5GB | 85 | 37 | 64 |

FIG. 9D

RAM OVERHEAD TABLE (970)

| GB RAM (974) | CORES (976) | OVERHEAD (978) |
|---|---|---|
| 0.5 (972-1) | 1 | 116.68 MB |
| 4 (972-2) | 4 | 325 MB |
| 24 (972-3) | 4 | 770 MB |
| ⋯ | ⋯ | ⋯ |
| 32 (972-j) | 8 | 1647 MB |

VIRTUAL MACHINE ALLOCATION IN A COMPUTING ON-DEMAND SYSTEM

BACKGROUND INFORMATION

The term "virtualization" encompasses creating and running a simulated computer environment (e.g., a virtual machine) on a hardware or software platform. The simulated computer environment may, in turn, include a software system (e.g., operating system) that hosts one or more applications. Such virtual machines may be configured to simulate physical computers with various capabilities and capacities, such as computing power and architecture, memory, etc.

BRIEF DESCRIPTION OF THE DRAWINGS

FIG. 7 is a diagram of an exemplary operating system capabilities table;

FIGS. 9A-9D are diagrams of an exemplary cluster limits table, a physical device capabilities table, an allocated cluster table, and a RAM overhead table, respectively;

DETAILED DESCRIPTION OF PREFERRED EMBODIMENTS

The following detailed description refers to the accompanying drawings. The same reference numbers in different drawings may identify the same or similar elements.

A system may provision both virtual resources and physical resources. When a user wishes to obtain computing resources, such as a virtual machine, a server, an application, a web server, etc., the user may connect to an integrated provisioning system via a web portal. Once connected via a web interface, the user, such as a customer service representative or a customer may input parameters that describe the desired resource. Based on the parameters and information relating to existing resources allocated in the system, the integrated resource provisioning system retrieves information regarding available resources, previously allocated resources, and various system limitations. Based on this information, the provisioning system identifies viable physical host candidates on which to place the requested resource and scores/ranks the candidates. An optimal physical candidate is selected for provisioning and the requested resource is provisioned on the optimal candidate.

Figure 1:
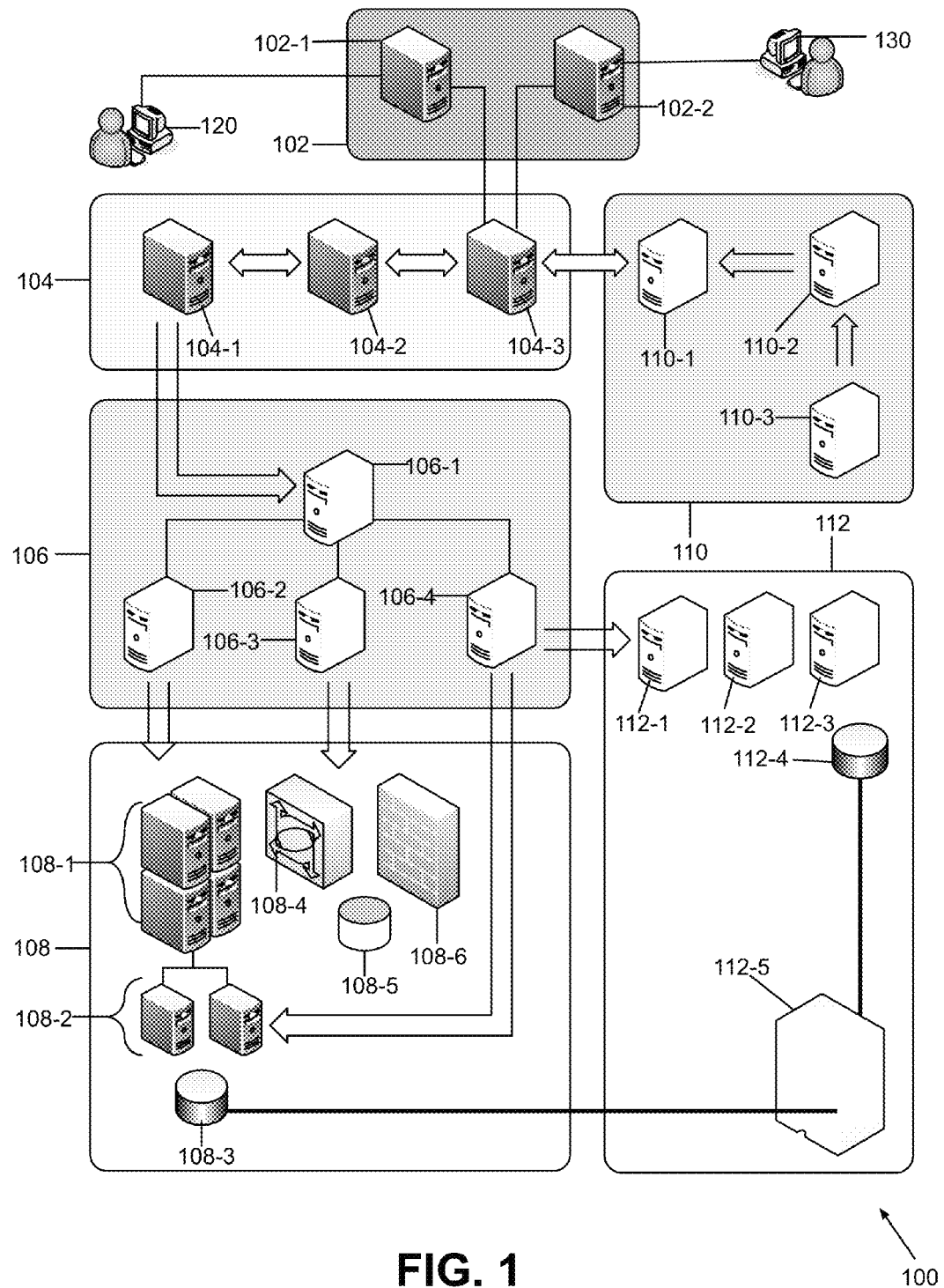
FIG. 1 is a diagram illustrating an exemplary network in which concepts described herein may be implemented.

FIG. 1 is a diagram illustrating an exemplary network in which concepts described herein may be implemented. In one implementation, network 100 may include one or more wired and/or wireless networks that are capable of exchanging information, such as voice, video, data, multimedia information, text, etc. For example, network 100 may include one or more public switched telephone networks (PSTNs) or another type of switched network. Network 100 may also include one or more wireless networks and may include a number of transmission towers for receiving wireless signals and relaying the received signals toward the intended destination. Network 100 may further include one or more packet switched networks, such as an Internet Protocol (IP) based network, a local area network (LAN), a wide area network (WAN), a personal area network (PAN), an intranet, the Internet, or another type of network that is capable of exchanging information.

As shown, network 100 may include a presentation network 102, resource management network 104, workflow network 106, virtual system network 108, inventory management network 110, and physical resource network 112. For simplicity and ease of understanding, network 100 of FIG. 1 does not show other network or network components, such as bridges, routers, switches, wireless devices, etc. Depending on the implementation, network 100 may include additional, fewer, or different networks and/or network components.

Presentation network 102 may include devices that interact with users and system administrators. As further shown in FIG. 1, presentation network 102 may include an administrator portal device 102-1 and a user portal device 102-2. Administrator portal device 102-1 may interact with and relay information between a system administrator device, shown as item 120, and resource management network 104. Through the interaction, system administrator device 120 may perform system/network administration tasks (e.g., managing user accounts, performing an action that a user is not authorized to perform, etc.).

User portal device 102-2 may interact with and relay information between a user device, illustrated as item 130, and resource management network 104. User device 130 may access provisioning services that are available via user portal device 102-2. For example, user device 130 may request resource management network 104 to create a virtual machine, provision a physical server, configure a load balancer or firewall, etc.

Resource management network 104 may provide provisioning services. In providing the provisioning services, resource management network 104 may track pools of resources that are available to user device 130, reserve a portion of the resources based on a request from user device 130, and allocate the reserved resources to user device 130. In addition, resource management network 104 may deallocate the resources (e.g., return the portion to the pool) when user device 130 indicates that the user does not need the resources.

In addition, resource management network 104 may provide support for administrative tasks (e.g., administer user, perform resource allocation tasks that a user is not authorized to perform, etc.) and/or configuration tasks.

As further shown in FIG. 1, resource management network 104 may include a job database device 104-1, resource manager database 104-2, and resource management device 104-3. Job database device 104-1 may receive a job description (e.g., a list of tasks) from resource management device 104-3 and store it in an active job queue until the job is performed. Resource manager database 104-2 may store and/or retrieve configuration/usage data pertaining to a particular user and/or other bookkeeping information. In addition, resource manager database 104-2 may maintain information regarding resources or services available and/or otherwise allocated in network 100. For example, resource manager database 104-2 may include information relating to available server clusters, such as numbers of CPUs, RAM, datastore limits, etc.

Resource management device 104-3 may receive a request for services from administrator/user device 120/130 via portal devices 102-1 and 102-2, and render the requested services. In addition, as described below, upon receiving a request for a particular resource, such as a request for Virtual Machine (VM) allocation, resource management device 104-3 may identify available resources (e.g., server clusters) corresponding to the request, rank the available resources based on a score calculated for each resource, and initiate fulfillment of the request to the highest ranking resource. In performing these tasks, resource management device 104-3 may execute functions that are listed in FIG. 5. For example, resource management device 104-3 may identify available underlying resources (e.g., server clusters) that match or otherwise accommodate the requested resource (e.g., a VM), rank the matching underlying resources based on suitability for the requesting entity and a number of additional factors, and provision or create the requested resource based on the highest ranking matching resource.

In provisioning the requested resource, resource management device 104-3 may create a description of a job based on the received user request relayed by user portal device 102-2; user configuration; and the identified highest matching underlying resource. Resource management device 104-3 may handoff the job description to job database device 104-1, to be placed in the active job queue. In some implementations, resource management device 104-3 may provision multiple servers, allocate Internet Protocol (IP) addresses to the servers, provision a storage space shared by the servers, create a virtual machine or server, create a cluster from the servers, configure devices or components of network 100, such as a load balancer or firewall.

In providing the services, resource management device 104-3 may manage resource objects that correspond to physical or virtual resources in networks 102-112. Thus, for example, when user device 130 requests information relating to a physical server via user portal device 102-2, resource management device 104-3 may provide user device 130 with information from the resource object representing the physical server. Resource management device 104-3 may receive data for instantiating the resource objects from one or more databases in networks 102-112 (e.g., a database in network 110).

Workflow network 106 may perform jobs whose descriptions are in the active job queue at job database device 104-1. Once the job is performed, workflow network 106 may instruct job database device 104-1 to dequeue the job description (e.g., provisioning a server, creating a cluster, etc.). As further shown in FIG. 1, workflow network 106 may include a workflow engine device 106-1, a virtual machine management (VMM) control device 106-2, a network management device 106-3, and a resource lifecycle management device 106-4.

Workflow engine device 106-1 may perform subtasks of a job as defined by a job description in the active job queue at job database device 104-1. In one implementation, workflow engine device 106-1 may poll the active job queue to detect the job description. Workflow engine device 106-1 may request job database device 104-1 to remove the job description from the queue when the subtasks are completed.

In driving/performing each of the subtasks of a job, workflow engine device 106-1 may employ VMM control device 106-2, network management device 106-3, and/or resource lifecycle management device 106-4. Each of the subtasks in the job description may entail allocation, deallocation, controlling, and/or monitoring of virtual resources, physical resources, and/or network resources. For example, assume that user device 130 requests resource management device 104-3 to allocate a virtual machine. In response, resource management device 104-3 may create a job description that includes subtasks for creating a virtual machine, and place the job description at job database device 104-1.

When workflow engine device 106-1 is about to perform the subtasks associated with creating the virtual machine, work flow engine device 106-1 may dispatch one or more requests for performing virtual machine-related functions to VMM control device 106-2 (e.g., a request to create the virtual machine, clone a virtual machine, etc.). VMM control device 106-2, upon receiving requests from workflow engine device 106-1, may control and/or monitor one or more virtual machines by interacting with hypervisors. The term "hypervisor," as used herein, may refer to any application or system that monitors, creates, runs, removes, and/or controls a virtual machine (e.g., controls a lifecycle of a virtual machine) on a physical device. For example, when VMM control device 106-2 receives a request to create a virtual machine from workflow engine device 106-1, VMM control device 106-2 may issue a command to a hypervisor. The hypervisor may create the virtual machine on the host device.

Network management device 106-3 may perform network configuration functions on behalf of workflow engine device 106-1. The functions may include configuring network infrastructure components. FIG. 1 shows a number of different types of network objects that network management device 106-3 may manage, such as, for example, a virtual load balancer 108-4, a virtual LAN 108-5, and a virtual firewall 108-6.

Resource lifecycle management device 106-4 may perform subtasks for provisioning a physical hardware device for the user. For example, resource lifecycle management device 106-4 may install an operating system on a server, install an application, etc. As shown in FIG. 1, resource lifecycle management device 106-4 may act on physical server devices 112-1 through 112-3 as well as virtual machines 108-2, as described below.

Virtual system network 108 may include devices and/or components for hosting and implementing virtual machine-related and network component-related resources that may be provisioned for the user. As shown, these resources may include a hypervisor cluster 108-1, virtual machines 108-2, logical volume 108-3, virtual load balancer 108-4, virtual LAN 108-5, and virtual firewall 108-6.

Hypervisor cluster (sometimes referred to as "cluster" or "server cluster") 108-1 may include a logical group of hypervisors and a hypervisor manager (not shown). By clustering or grouping a number of hypervisors (and their corresponding physical devices), failover protection and high availability may be provided to end users. When hypervisor cluster 108-1 receives a command or a request from VMM control device 106-2 (e.g., to create a virtual machine), the hypervisor manager may issue a command/request to a hypervisor. The hypervisor may then create the virtual machine on a host device on which the hypervisor is installed. Depending on the implementation, the hypervisor may be hosted on a hardware device without an operating system, or alternatively, may be hosted as a software component running on top of an operating system. Additionally, each host device may include particular capabilities that the hypervisor may allocate to virtual machines created thereon, such as memory, numbers of CPU cores, storage bandwidth, etc.

Virtual machines 108-2 may include a software emulation of a computer system (e.g., a server, a personal computer, etc.). Each virtual machine 108-2 may be instantiated, removed, and managed by a hypervisor. Once created, user device 130 may utilize virtual machine 108-2 as if it were a physical device.

Logical volume 108-3 may include storage on a network (e.g., network attached storage (NAS), a disk in a storage area network (SAN), etc.). Logical volume 108-3 may be allocated as a resource by workflow engine device 106-1. Once allocated, logical volume 108-3 may be mounted on a mount point on a virtual machine and used as storage (e.g., a file system, swap space, etc.). Virtual load balancer 108-4 may include an emulation of a load balancer, and may be instantiated or removed upon demand from user device 130. Virtual LAN 108-5 may be created upon demand from user device 130. User device 130 may configure and place selected virtual and physical resources on specific virtual LAN 108-5. Virtual firewall 108-6 may include an emulation of a physical firewall, and may be instantiated or deleted and configured upon demand from user device 130. Once provisioned, virtual firewall 108-6 may be attached to virtual LAN 108-5 to protect the virtual and/or physical resources against undesired network traffic.

Inventory management network 110 may track inventory of network resources and provide inventory information to resource management network 104. As further shown in FIG. 1, inventory management network 110 may include an IP address management device 110-1, a data warehouse device 110-2, and an inventory management device 110-3.

IP address management device 110-1 may provision an IP address from a pool of IP addresses. In one implementation, in provisioning an IP address, IP address management device 110-1 may take into account network address translation schemes to identify which VLAN the IP address belongs to, such that an IP address conflict does not arise within the VLAN. When IP address management device 110-1 de-provisions an IP address, IP address management device 110-1 may return the IP address to the pool of IP addresses. In addition, IP address management device 110-1 may maintain a listing or a table of available IP addresses (e.g., in the pool of IP addresses).

Data warehouse device 110-2 may include a database or an inventory of resources that are available for provisioning, resources that have been provisioned for the user, and configuration management information. When a resource is newly added to a resource pool, is provisioned, or is de-provisioned, data warehouse device 110-2 may update/record the information (e.g., inventory information) about the resource into the database. In addition, data warehouse device 110-2 may write and insert data associated with a configuration (e.g., a version of an operating system that is installed on a provisioned physical server, an IP address, etc.) into the database when resource configuration changes.

Inventory management device 110-3 may obtain inventory and configuration related information by monitoring physical devices, and passing the information to data warehouse device 110-2.

Physical resource network 112 may include physical resources. These physical resources may be provisioned/de-provisioned upon a request from resource lifecycle management device 106-4. When physical resources in physical resource network 112 are provisioned/de-provisioned, resource lifecycle management device 106-4 or inventory management device 110-3 may update data warehouse device 110-2 with information about the provisioning and configuration information.

As further shown in FIG. 1, physical resource network 112 may include physical resources 112-1 through 112-3 (individually referred to as physical resource 112-x and collectively as physical resources 112), a logical volume 112-4, and a storage device 112-5. Physical resource 112-x may include a physical device or a component that may be provisioned via resource lifecycle management device 106-4. Logical volume 112-4 may include similar components as logical volume 108-3, and may operate similarly. Unlike logical volume 108-3 that is mounted on a virtual machine, however, logical volume 112-4 may be mounted on physical resource 112-x. Storage device 112-5 may include storage from which logical volumes (e.g., logical volume 108-3 or 112-4) may be allocated. Examples of storage device 112-5 may include a SAN disk and NAS devices.

In FIG. 1, although each of networks 102 through 112 are shown as including a number of devices, in an actual implementation, networks 102 through 112 may include additional, fewer, or different devices than those shown in FIG. 1. In addition, depending on the implementation, functionalities of each of the devices within networks 102-112 may be aggregated over fewer devices or distributed over additional devices. For example, in one implementation, functionalities of devices 112-1 through 112-3 in physical resource network 112 may be provided by a single server device.

Figure 2:
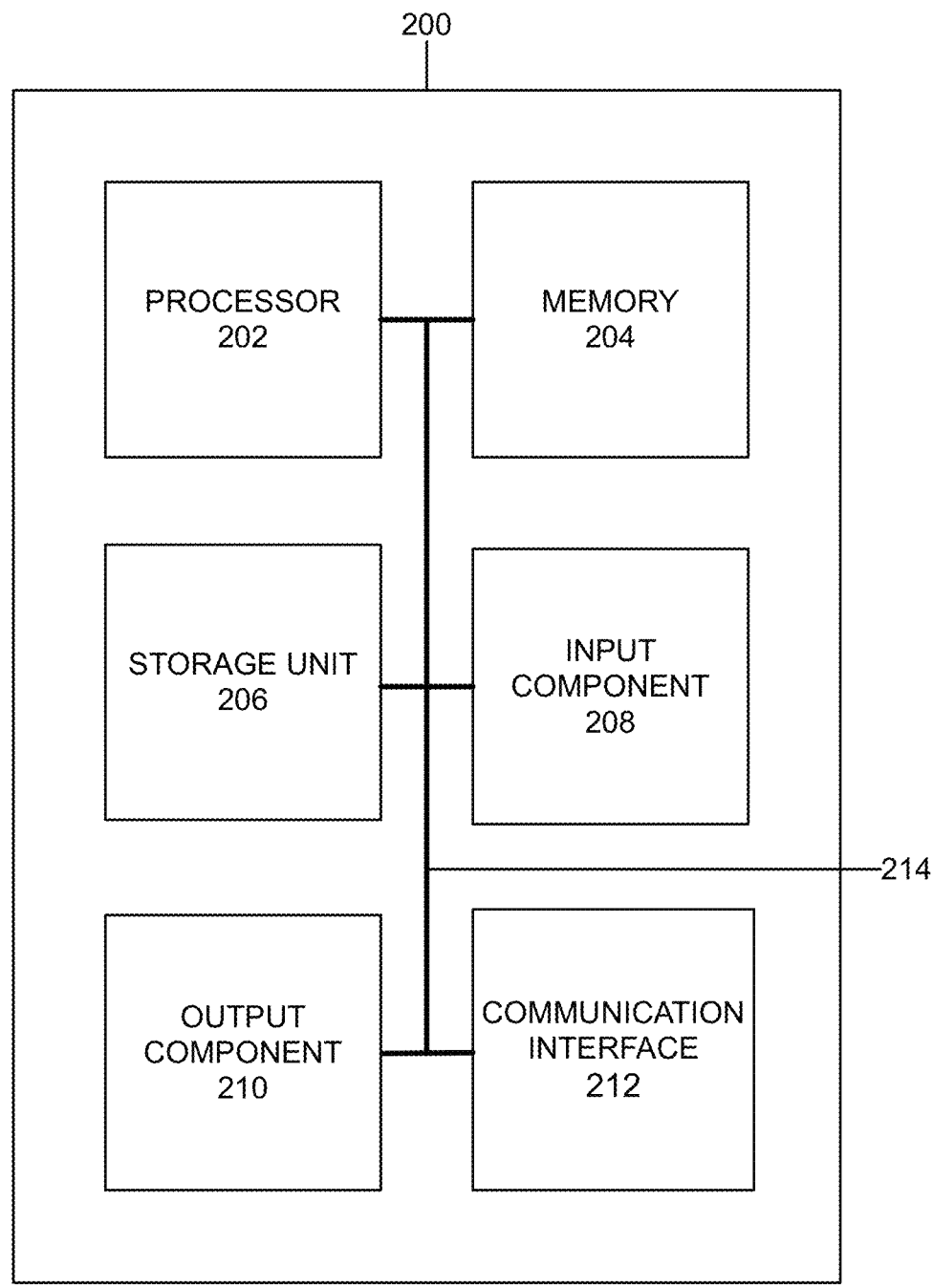
FIG. 2 is a block diagram of an exemplary network device shown in FIG. 1.

FIG. 2 is a block diagram of an exemplary network device 200. Network device 200 may be used to implement each of devices 104-1 through 104-3, 106-1 through 106-4, 110-1 through 110-3, 112-1 through 112-3, and 112-5. In addition, network device 200 may also be used to implement components of a device that host a hypervisor. As shown in FIG. 2, network device 200 may include a processor 202, a memory 204, a storage unit 206, an input component 208, an output component 210, a communication interface 212, and a bus 214.

Processor 202 may include one or more processors, microprocessors, application specific integrated circuits (ASICs), field programmable gate arrays (FPGAs), or other processing logic that may interpret and execute instructions. Memory 204 may include static memory, such as read only memory (ROM), and/or dynamic memory, such as random access memory (RAM) or onboard cache, for storing data and machine-readable instructions. Storage unit 206 may include a magnetic and/or optical storage/recording medium. In some embodiments, storage unit 206 may be mounted under a directory tree or may be mapped to a drive. In some implementations, storage unit 206 may be part of another network device (e.g., storage device 112-5) or a network (e.g., storage area network (SAN)). Depending on the context, the term "medium," "memory," "storage," "storage device," "storage medium," and/or "storage unit" may be used interchangeably. For example, a "computer-readable storage device" or "computer readable storage medium" may refer to both a memory and/or a storage device.

Input component 208 may permit a user to input information to network device 200. Input component 208 may include, for example, a keyboard, a keypad, a mouse, a pen, a microphone, a touch screen, voice recognition and/or biometric mechanisms, etc. Output component 210 may include a mechanism that outputs information to the user. Output component 210 may include, for example, a display, a printer, a speaker, etc. In some implementations, because network device 200 may operate as a server device, network device 200 may include a minimal number of input components 208 and output components 210 (e.g., a keyboard and/or a console), to minimize cost and to increase robustness.

Communication interface 212 may enable network device 200 or the components of network device 200 to communicate with other devices and/or systems via a network, and may include one or more network interface cards (e.g., an Ethernet interface) for communicating with other devices. In one implementation, communication interface 212, for example, may be attached to a server blade that hosts processor 202. Bus 214 may provide an interface through which components of network device 200 can communicate with one another.

In FIG. 2, network device 200 is illustrated as including components 202-212 for simplicity and ease of understanding. In an actual implementation, network device 200 may include additional, fewer, or different components. For example, assuming that network device 200 is a virtual machine, components 202-212 may include virtual components. In another example, network device 200 may include one or more power supplies, fans, motherboards, video cards, etc. In yet another example, the components of network device 200 may be distributed over a network or multiple devices within a network, such as network 100.

Figure 3:
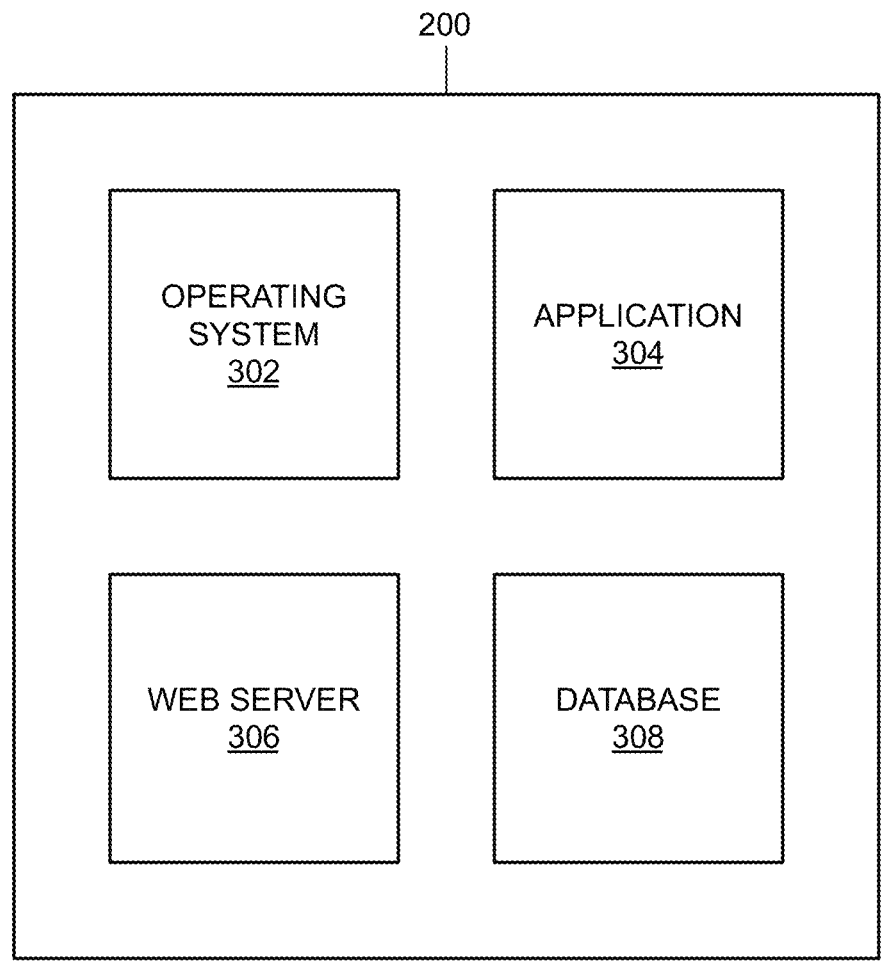
FIG. 3 is a block diagram illustrating exemplary functional components of the network devices shown in FIG. 1.

FIG. 3 is a block diagram illustrating exemplary functional components of network device 200. As shown, network device 200 may include an operating system 302, application 304, web server 306, and database 308. Depending on the implementation, network device 200 may include additional, fewer, or different components than those illustrated in FIG. 3.

Operating system 302 may manage hardware and software resources of network device 200. Operating system 302 may manage, for example, its file system, device drivers, communication resources (e.g., transmission control protocol (TCP)/IP stack), event notifications, etc.

Application 304 may include a software program and/or scripts for rendering services. For example, in resource management device 104-3, application 304 may take the form of one or more programs for provisioning resources. Other examples of application 304 include a file transfer protocol (FTP) server, an email server, a telnet server, servlets, Java™ virtual machine (JVM), web containers, firewall, components to support Authorization, Authentication and Accounting (AAA), and other applications that either interact with client applications or operate in stand-alone mode. In addition, application 304 may include a specialized server program, application server, web page, etc.

Web server 306 may include a software application for exchanging web page related information with one or more browsers and/or client applications. Database 308 may include records and files and may act as an information repository for network device 200. For example, in resource manager database 104-2, database 308 may store and retrieve configuration/usage data pertaining to a particular user. In another example, database 308 in job database device 104-1 may implement persistent queues for storing job descriptions. In such implementations, the queue may be robust and, therefore, recoverable upon device failure.

Figure 4:
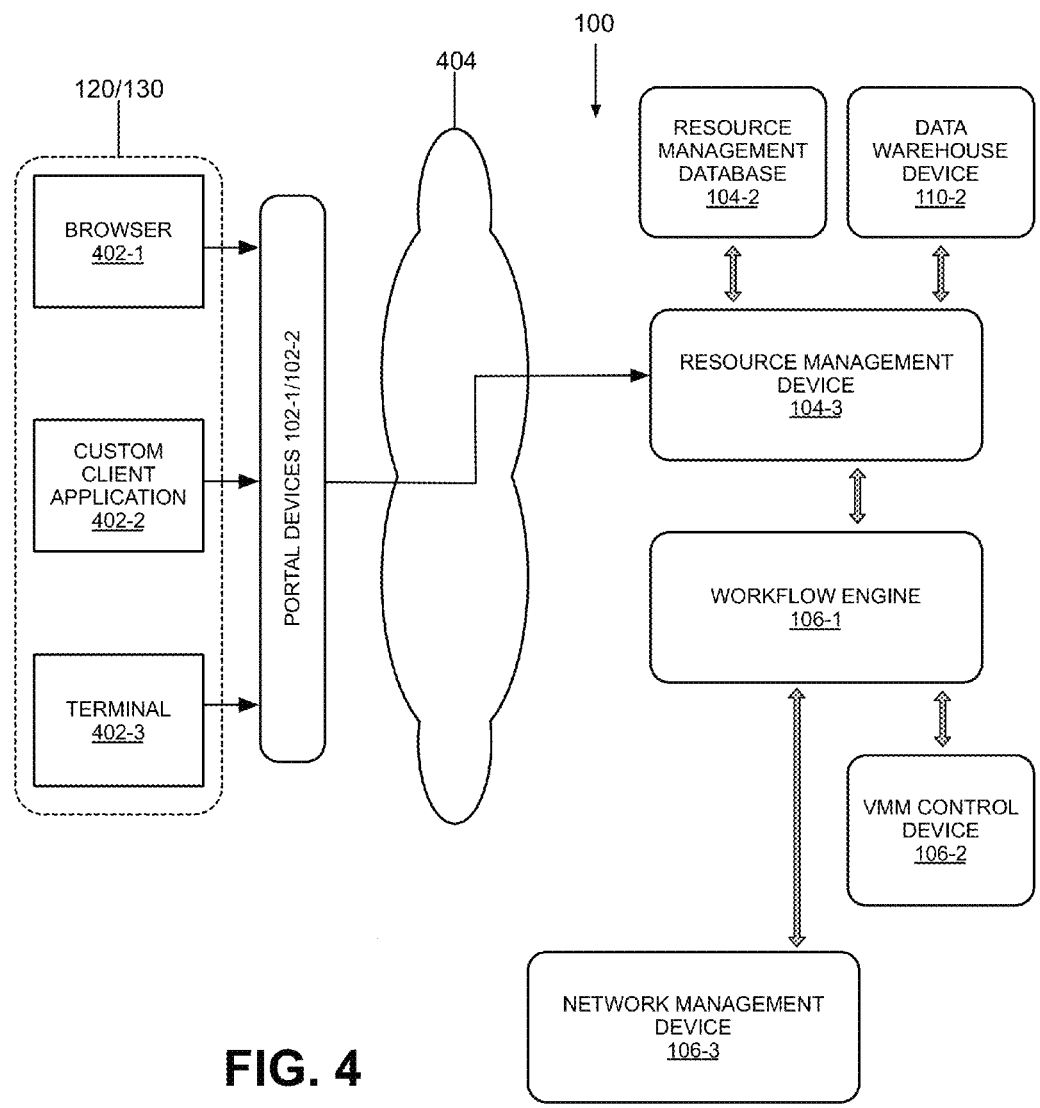
FIG. 4 is a diagram that illustrates an exemplary interaction between a user device, a resource management device, a workflow engine, a virtual machine management (VMM) control device, and a network management device of FIG. 1 for provisioning and/or managing virtual machine resources.

FIG. 4 illustrates interaction between administrator/user device 120/130, portal devices 102-1 and/or 102-2, resource management device 104-3, resource management database 104-2, data warehouse device 110-2, workflow engine 106-1, VMM control device 106-2, and network management device 106-3 for identifying, ranking, and provisioning resources associated with network 100 in the manner described below. As shown in FIG. 4, administrator/user device 120/130 may interact with resource management device 104-3 over network 404. Network 404 may be part of network 100 and may interconnect various elements of network 100, such as user portal device 102-2, resource management device 104-3, etc.

As further shown in FIG. 4, administrator/user device 120/130 may host different types of client applications, such as a browser 402-1, custom client application 402-2, and/or terminal 402-3 (e.g., xterm). Browser 402-1 may include a web browser (e.g., Chrome, Firefox, Internet Explorer, etc.). Custom client application 402-2 may include a software component specifically designed for interacting with VMM control device 106-2 and/or hypervisor cluster 108-1, e.g., via an application programming interface (API) or other interface methodology (e.g., client/server, etc.). Terminal 402-3 may include a command line based client terminal (e.g., a command line interface (CLI) for remotely accessing different services, such as telnet services, FTP services, etc.

Users may initiate provisioning of a particular VM 108-2, based on information provided in an initial resource request, such as CPU speed, number of cores, required memory, operating system (OS), etc. Prior to executing (or attempting to execute) the provisioning requests (e.g., via workflow engine 106-1), network management device 104-3 may determine optimal placement of the requested VM on a particular hypervisor cluster 108-1 selected from a number of possible hypervisor clusters. That is, network management device 104-3 may identify a particular cluster to use for creation of a VM to meet the customer's requirements and, as described below, to support potential upgrades or additional customer requests at a time subsequent to the initial provisioning of the VM.

More specifically, based on the received VM provisioning request, resource management device 104-3 may initiate requests for and receipt of status and other inventory information relating to the requested VM resource. For example, resource management device 104-3 may extract resources information from data warehouse device 110-2 resource management database 104-2, etc. In other embodiment, requests for information may be relayed via tasks or operations performed by workflow engine 106-1 at the request of resource management device 104-3.

In FIG. 4, administrator/user device 120/130 may facilitate the optimal provisioning of a VM via a request received via browser 402-1. Through different devices (e.g., user portal device 102-2, etc.), a user's VM request may initially reach resource management device 104-3. Resource management device 104-3 may, prior to carrying out any provisioning functions, identify optimal placement of the requested VM on a particular hypervisor cluster 108-1. As described below, this identification may be based on a number of factors, such as CPU core count, memory (e.g., RAM memory), current cluster allocation, datastore capabilities, cluster failover and high availability (HA) requirements, cluster load requirements. As described above, each hypervisors clusters 108-1 may correspond to a number of different physical host devices 112. Accordingly, several factors described herein may relate to capabilities corresponding to the host devices on which each hypervisor cluster 108-1 is installed. Once an optimal cluster is identified, the requested VM may be provisioned by queuing VM provisioning tasks relating to the identified cluster in workflow engine 106-1.

Figure 5:
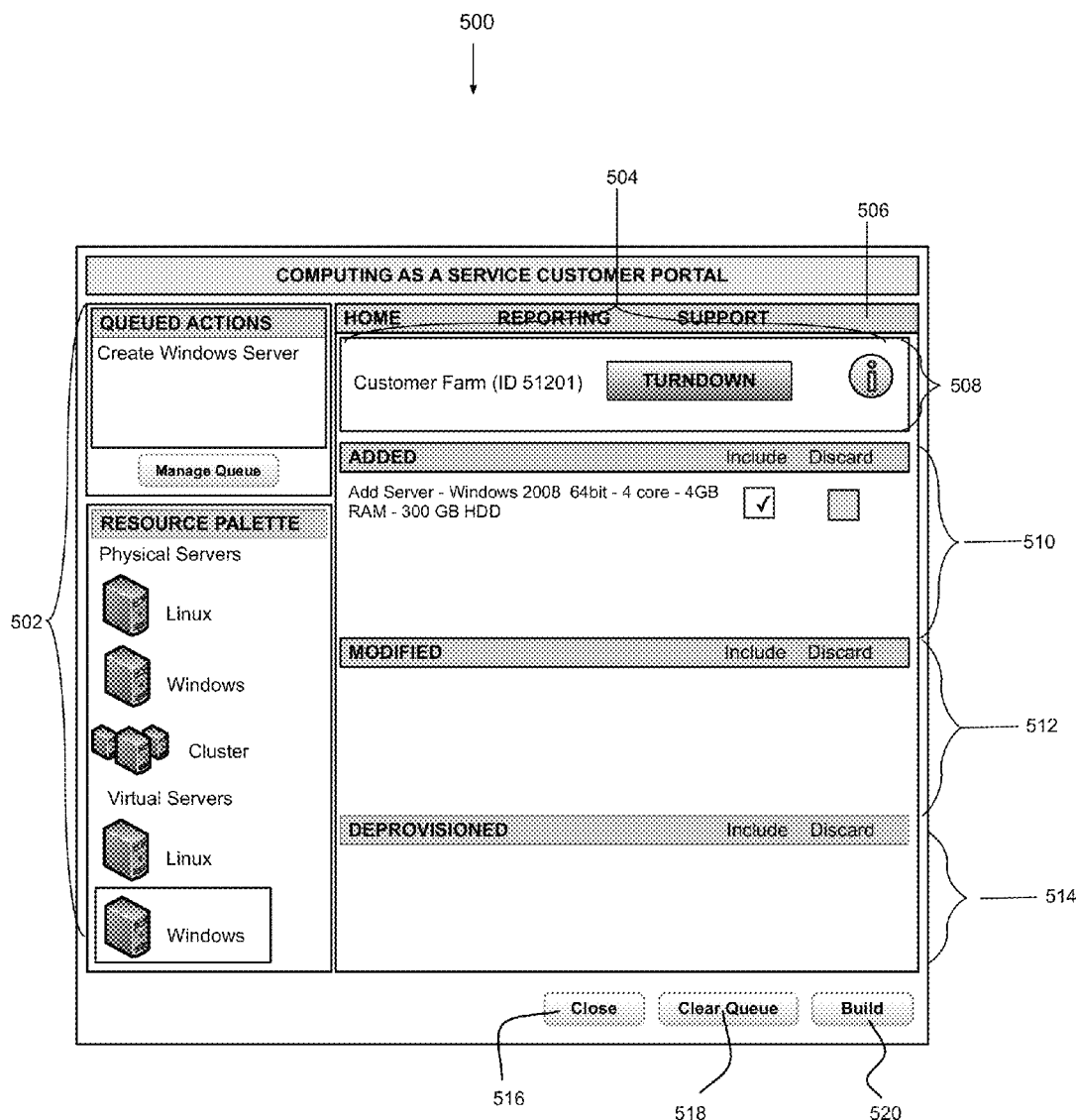
FIG. 5 is a diagram that illustrates an exemplary view of a web-based user interface for provisioning computing resources.

FIG. 5 illustrates an exemplary view 500 of a web-based user interface for controlling, monitoring, provisioning, and/or de-provisioning resources. More specifically, view 500 shows a web page for presenting resources that a user has requested for provisioning, e.g., a to-be-built page depicting resources listed prior to building on virtual or physical devices. Some features of a typical web browser, such as navigation bar, are not illustrated for the sake of ease in presentation. Depending on the implementation, the web page may include additional, fewer, or different graphical elements and/or features than those shown in FIG. 5.

As shown, the web page may include a side pane 502 and a main pane 504. Side pane 502 may include a list or "palette" of available server types, and a listing of jobs that are pending for execution (e.g., by workflow engine 105-1). Main pane 504 may include menu bar 506, short cut buttons 508, and "Added" resources section 510, "Modified" resources section 512, and "Deprovisioned" resources section 514. Menu bar 506 may provide links to other web pages, such as "Home," "Reporting," or "Support" page. Short cut buttons 508 includes buttons for executing commands "turndown" or additional information.

"Added" resources section 510 may include a listing of resources requested for provisioning by the user, such as a particular VM. As shown, "Added" resources section 510 in FIG. 5 includes a request to add a VM running Windows server 2008 64-Bit, with 4 CPU cores, 4 GB of RAM, and a 300 GB hard disk drive (HDD). For each resource listed, selections are provided to include the resource in a build and delete or discarding the resource from the build list. "Modified" resources section 512 may include a listing of resources requested for change and "Deprovisioned" resources section 514 may include a listing of resources selected for deprovisioning.

The web page may include options relating to submission of the resource provisioning request. For example, the web page may include a "Close" option 516, a "Clear Queue" option 518, and a "Build" option 520. User selection of "Close" option 516 keeps resources in the build page, but closes it for later modification or submission (e.g., building). User selection of "Clear Queue" option 518 removes any requested resource changes in the web page. As described above, when the requested resource includes a VM, such as a virtual server, user selection of "Build" option 520 initiates selection of an optimal cluster on which to place the VM, and provisioning of the requested VM on the identified optimal cluster.

In other implementations, not shown, the request to build or provision a VM may be received by resource management device 104-3 via an API executing or called by a client application, such as custom client application 402-2 in FIG. 4. In such a configuration, information regarding the requested VM may be received via portal device 102-1/102-2 as CLI instructions, etc.

Figure 6:
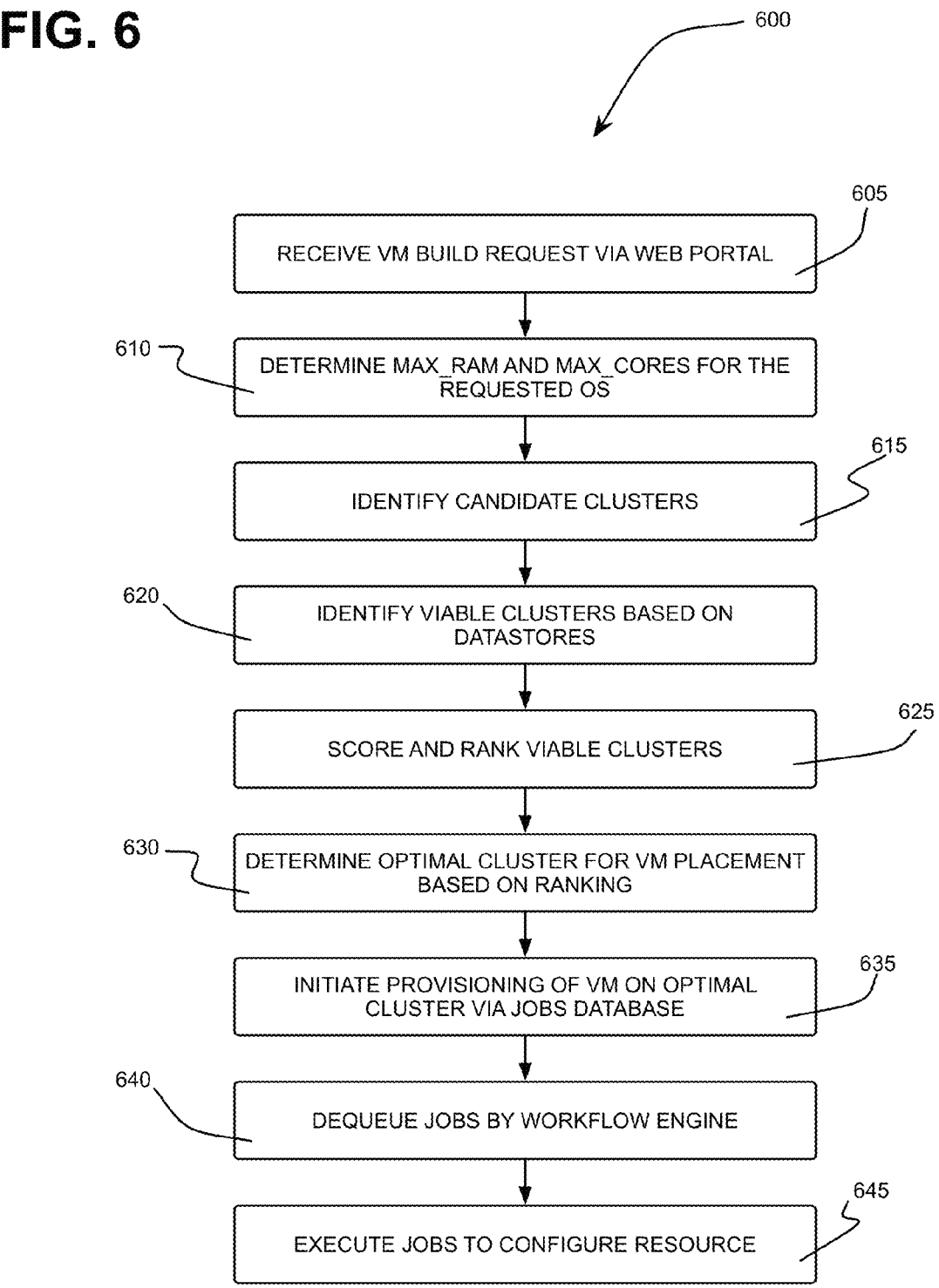
FIG. 6 is a flow diagram of an exemplary process for provisioning a virtual machine on an optimal cluster in a computing as a service system.

FIG. 6 is a flow diagram of an exemplary process that is associated with provisioning a VM on an optimal cluster consistent with embodiments described herein. Process 600 may begin upon receipt of a request to provision a VM (block 605). For example, user web portal device 102-2 may provide user interface view 500 to user device 130 that includes a build or a provision option 520. Prior to providing interface view 500 to the user, user web portal device 102-2 may have provided other resource configuration views or web pages for receiving VM request selections and configuration information, including OS requested, CPUs (e.g., numbers of cores) requested, and RAM requested. In other embodiments, additional information may be received from a user during a VM creation request, such as hard drive size, IP address (either real or virtual), etc. User web portal device 102-2 may receive a selection of "Build" option 520. In other embodiments, the VM provision request may be received via an API associated with client application 402-2 or via command line instructions from terminal 402-3.

In response to the VM provisioning request, resource management device 104-3 may retrieve information relating to the maximum RAM and CPUs supported by the requested VM OS type (block 610). For example, resource management device 104-3 may retrieve an OS capabilities table from a resource management database 104-2 and/or data warehouse device 110-2 and, from this information, may extract the maximum RAM and CPU information for the OS type selected in the VM build request.

FIG. 7 illustrates an exemplary embodiment of an OS capabilities table 700. As shown OS capabilities table 700 may include a number of entries 702-1 to 702-n (collectively referred to entries 702 and individually as entry 702) corresponding to a number of possible VM operating systems configurations. Each entry 702 may include fields corresponding to OS name (704), edition (706), architecture (708), maximum CPUs supported (710), and maximum RAM supported (712). From table 700, resource management device 104-3 may extract the maximum supported CPUs information (field 710) and the maximum supported RAM information (field 712) corresponding to the OS identified in the VM build request.

Referring back to FIG. 6, resource management device 104-3 may identify candidate clusters from a number of available clusters (block 615). For example, resource management device 104-3 may identify candidate clusters based on the information provided in the VM build request and the maximum CPUs and RAM information retrieved in block 610. Based on the identified candidate listing, viable clusters may be identified based on datastores associated with the candidate clusters (block 620). This may further filter or winnow down the listing of candidate clusters to those having viable datastores associated therewith. In addition, resource management device 104-3 may filter candidate clusters based on other information, such as hard drive space, etc.

Resource management device 104-3 may score the candidate clusters and may rank the candidate clusters based on their scores (block 625). Based on the ranking, an optimal cluster for placement of the VM may be identified (block 630). For example, resource management device 104-3 may select the highest ranking candidate cluster as the optimal cluster. Next, provisioning of the VM on the optimal cluster may be initiated (block 635). For example, resource management device 104-3 may add or queue one or more jobs relating to the VM provisioning to jobs database device 104-1 for execution by workflow engine 106-1 in the manner described above. The queued jobs may be dequeued by workflow engine 106-1 in the manner described above (block 640) and executed to provision the requested resource(s) (block 645).

By providing a system for identifying, filtering, scoring, and ranking candidate clusters, prior to provisioning a VM, an optimal allocation of resources may be selected thereby providing the most efficient upgrade potential for the user while preventing resources from being allocated to lower-capacity VMs.

Figure 8:
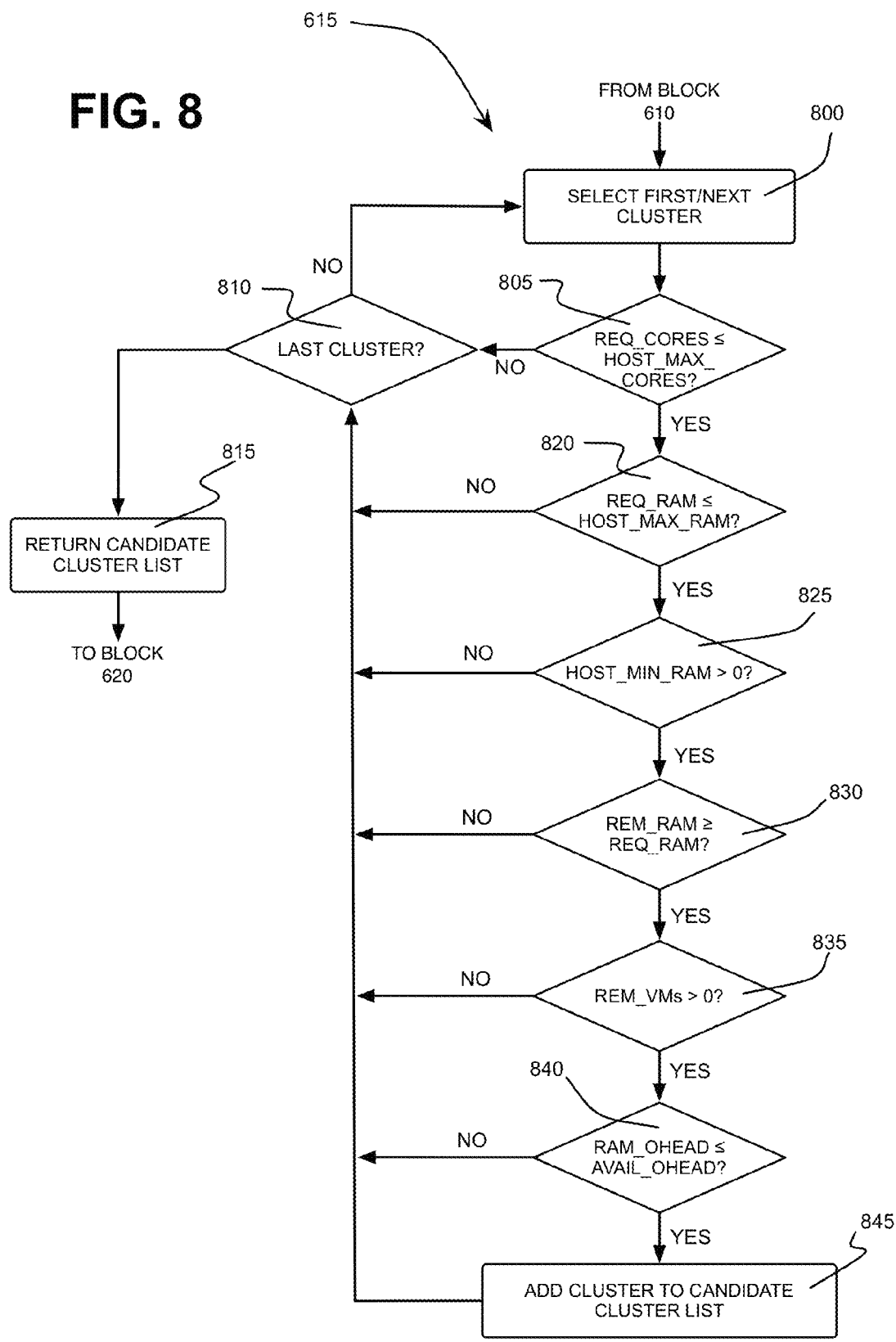
FIG. 8 is a flow diagram of an exemplary process for identifying candidate clusters.

FIG. 8 is a flow diagram illustrating an exemplary process for identifying candidate clusters corresponding to block 615 in FIG. 6. The process of FIG. 8 may begin following identification of the maximum CPUs and RAM information for the selected VM OS in block 610.

Initially, resource management device 104-3 may select a first/next available cluster for candidacy determination (block 800). For example, resource management device 104-3 may retrieve a listing of available clusters and may select a first cluster from the list. Next, resource management device 104-3 may determine whether the number of CPU cores requested is less than or equal to the maximum number of CPU cores available on the cluster (block 805). For example, resource management device 104-3 may extract the number of CPUs requested from the VM build request and may extract/retrieve the maximum number of CPU cores on the cluster from one or more of 1) a VM cluster limits table relating to VM configuration limitations for the hypervisor and hypervisor cluster, as well as any further performance or load-balancing based limitations, 2) a physical capabilities table that includes information relating to host server capabilities for the cluster, and 3) an allocated cluster table relating to cluster capacity previously allocated. The VM cluster limits table, the physical capabilities table, and the allocated cluster table may be stored or retrieved based on information maintained in data warehouse device 110-2 or other devices in network 100 and may include information relating to the capabilities, capacities, allocations associated with the various clusters 108-1 in network 100.

Figure 9A:
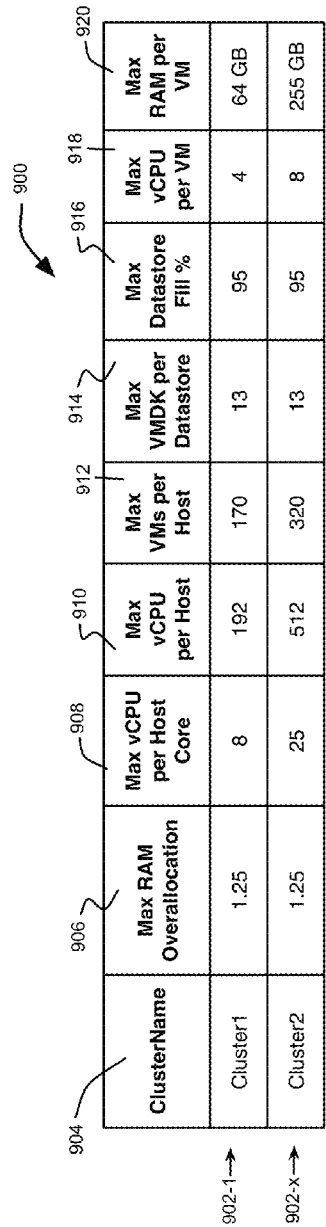

FIG. 9A illustrates an exemplary embodiment of a VM cluster limits table 900. As shown VM cluster limits table 900 may include a number of entries 902-1 to 902-x (collectively referred to entries 902 and individually as entry 902) corresponding to the clusters 108-2 in network 100. Each entry 902 may correspond to a particular cluster and may include fields corresponding to cluster name (904), max amount of RAM overallocation allowed (906), maximum number of vCPUs per host core (908), maximum vCPUs per host (total) (910), maximum number of VMs per host (912), maximum number of VM disk files (VMDKs) per datastore (914), maximum datastore fill percentage (916), maximum vCPUs per VM (918), and maximum RAM per VM (920).

More specifically, the value in max RAM overallocation field 906 corresponds to a cluster configuration setting relating to an amount of RAM over a physical amount of RAM available on the cluster that may be allocated to users. In the present example, this overallocation limit is 125%, meaning that if a cluster includes physical RAM of 64 GB, 80 GB (or 125% of 64) may be allocated to particular VMs.

The value in max vCPUs per host core field 908 indicates a maximum number of virtual CPUs supported on a particular core of each host server device in the cluster. The value of this field is irrespective of the total vCPUs supported per host server device. In contrast to field 908, the value of max vCPUs per host field 910 corresponds to the maximum number of vCPUs supported on each host server in the cluster. The value of max VMs per host field 912 indicates a maximum number of VMs supported on each host server in the cluster.

A cluster's datastores refer to the storage devices that deliver storage space for VMs across multiple physical hosts. Each host server in a particular cluster may access multiple datastores. A VMDK is stored in the datastores and stores the contents of a VMs hard disk drive. VMDKs are accessed by VMs in a manner similar to a physical computer accessing a hard disk drive. Referring to table 900, the value of max VMDK per datastore field 914 indicates the maximum number of VMDKs per datastore for each particular cluster. The value of max datastore fill percentage field 916 indicates the maximum percentage of the cluster's datastores capacity that may be allocated to VMs.

The value of max vCPUs per VM field 918 indicates that maximum number of virtual CPUs supported on each VM on cluster and the value of the max RAM per VM field 920 indicates that maximum amount of the cluster's RAM that may be allocated to each VM on the cluster.

Figure 9B:
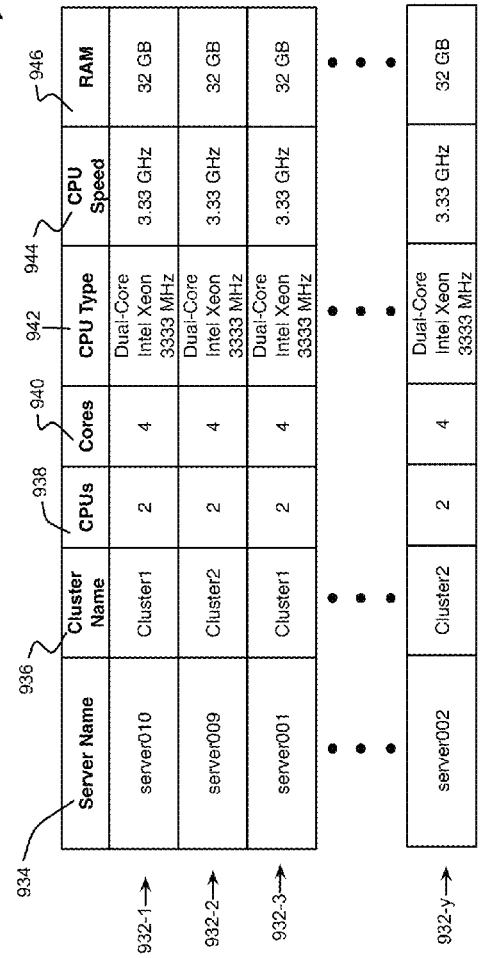

FIG. 9B illustrates an exemplary embodiment of a physical device capabilities table 930. As shown physical capabilities table 930 may include a number of entries 932-1 to 932-y (collectively referred to entries 932 and individually as entry 932), with each entry 932 corresponding to a host server in clusters 108-2. Each entry 932 may include fields corresponding to the name of a particular host server (934), the name of the cluster that the server is a part of (936), the number of physical CPUs on the host server (938), the number of CPU cores in each CPU (940), the CPU type (942), the CPU speed (944), and the amount of RAM on the server (946).

More specifically, the value in server name field 934 indicates a name (or other identifier) of a particular server and the value in cluster name field 936 indicates an identifier of the cluster of servers to which the particular server (identified in field 934) belongs. The values in CPUs field 938 and cores field 940 indicate the number of physical CPUs and cores, respectively, that are included in the particular server. The value in CPU type field 942 indicates the type/manufacturer of the server's CPUs. For example, as shown in FIG. 9B, an exemplary CPU type may include a dual-core Intel Xeon® 3333 MHz processor. The value in CPU speed field 944 indicates the processor speed of each CPU in the particular server and the value in RAM field 946 indicates the amount of RAM available on the server.

FIG. 9C illustrates an exemplary embodiment of an allocated cluster table 950. As shown allocated cluster table 950 may include a number of entries 951-1 to 951-z (collectively referred to entries 932 and individually as entry 951), with each entry 951 corresponding to a host server in clusters 108-2. Each entry 951 may include fields corresponding to information relating to particular clusters 108-2, such as cluster name (952), allocated RAM (954), allocated vCPUs (956), allocated VMs (958), and allocated VMDKs (960).

The value in cluster name field 952 indicates a name or other identifier associated with a particular cluster of host servers. The value in allocated RAM field 954 indicates an amount of RAM previously allocated to VMs hosted or running on the cluster. The value in allocated vCPU field 956 indicates the number of previously allocated vCPUs on the cluster, the value in allocated VMs field 958 indicates the number of previously allocated VMs on the cluster, and the value in allocated VMDK field 960 indicates the number of previously allocated VM disk files associated with the VMs running on the cluster.

FIG. 9D illustrates an exemplary embodiment of a RAM overhead table 970. As shown RAM overhead table 970 may include a number of entries 972-1 to 972-j (collectively referred to entries 972 and individually as entry 972), with each entry 972 corresponding to an overhead RAM requirement for a particular combination of RAM and CPU cores. Each entry 972 may include a GB RAM field 974, a cores field 976, and an overhead field 978. The values in GB RAM field 974 and cores field 976 indicate a combination of RAM and CPU cores that require the overhead RAM indicated in overhead field 978.

As described below, the information provided in the tables depicted in exemplary tables 900, 930, 950, and 970 may be retrieved and/or extracted by resource management device 104-3 and may be used to identify and rank candidate clusters for hosting a requested VM and for determining an optimal cluster for placement of the VM.

Returning to FIG. 8, in relation to block 805, resource management device 104-3 may determine the maximum cores available on the cluster based on various information extracted from tables 900, 930, and/or 950. For example, this determination may be based on the lesser of: 1) the maximum number of CPU cores per host server identified based on the values in fields 938 and 940 in table physical device capabilities table 930, 2) the maximum vCPUs supported per VM identified retrieved from field 918 of VM cluster limits table 900, and 3) the number of non-allocated cores on the cluster.

In one embodiment, the number of non-allocated cores on the cluster may be determined based on the following expression:

Non-Allocated Cores=
(Hosts*Cores*MaxVirtualCpuPerCore)−AllocatedVcpu, in which the number of allocated vCPUs (retrieved from field 956 in allocated cluster table 950) is subtracted from the product of the number of host servers in the cluster (from fields 934/936 in physical device capabilities table 930), the number of cores on each host (from field 940 in physical device capabilities table 930), and the maximum number supported vCPUs on each core (from field 908 in VM cluster limits table 900).

If it is determined that the number of CPU cores requested is not less than or equal to the maximum number of CPU cores available on the cluster (block 805—NO), resource management device 104-3 may proceed to block 810, in which it is determined whether any additional clusters need analyzed for candidacy. If more clusters remain to be analyzed (block 810—NO), the process returns to block 800 for a next available cluster.

However, if it is determined that the number of CPU cores requested is less than or equal to the maximum number of CPU cores available on the cluster (block 805—YES), e.g., that the cluster potentially has CPU capacity for the VM, resource management device 104-3 may determine whether the amount of RAM in the VM build request is less than or equal to the maximum amount of RAM on the cluster (block 820).

In one implementation, the maximum amount of RAM on the cluster may be determined as the lesser of 1) the lowest amount of RAM on any host server in the cluster retrieved from field 946 in physical device capabilities table for each server entry 932 in the cluster (e.g., 32 GB for Cluster 1 in table 930), 2) the maximum supported RAM per VM from field 920 in VM cluster limits table 900 (e.g., 64 GB for Cluster 1 in table 900), and 3) remaining RAM on the cluster retrieved. In one embodiment, the number of non-allocated cores on the cluster may be determined based on the following expression:

RemainingGB=(Hosts*GB/
host*MaxRamOverallocation)−total Ram allocated, in which the amount of previously allocated RAM for the cluster (retrieved from field 954 in allocated cluster table 950) is subtracted from the product of the number of host servers in the cluster (from fields 934/936 in physical device capabilities table 930), the amount of RAM per each host in the cluster (from field 946 in physical device capabilities table 930), and the maximum percentage of RAM overallocation supported (from field 906 in VM cluster limits table 900).

Using an example from tables 900, 930, and 950, and assuming the Cluster 1 includes 8 host servers, each having 32 GB of RAM, it can be determined that the remaining (allocatable) RAM on Cluster1 may be calculated as [8 (host servers)*32 (RAM per host server)*1.25 (RAM overallocation limit for Cluster1)]−292 (allocated RAM)=320−292=28 GB. This indicates that Cluster1 has 28 GB of RAM that may be allocated to new VMs.

If it is determined that the amount of RAM in the VM build request is not less than or equal to the maximum amount of RAM on the cluster (block 820—NO), resource management device 104-3 may again proceed to block 810, the processing of which is described above. However, if it is determined that the amount of RAM in the VM build request is less than or equal to the maximum amount of RAM on the cluster (block 820—YES), e.g., that the cluster potentially has available RAM capacity for the VM, resource management device 104-3 may determine whether the minimum amount of RAM on the cluster is greater than zero (block 825).

For example, resource management device 104-3 may determine whether the remaining RAM on the cluster is greater than zero. A determination of the remaining RAM on the cluster may be made in the same manner as that described above in relation to block 820. That is, for Cluster1, it may be determined that the amount of available RAM for allocation is 28 GB.

If it is determined that the minimum amount of RAM on the cluster is not greater than zero (block 825—NO), resource management device 104-3 may again proceed to block 810, the processing of which is described above. However, if it is determined that the minimum amount of RAM on the cluster is greater than zero (block 825—YES), e.g., that the cluster has any available RAM capacity, resource management device 104-3 may determine whether the remaining amount of RAM on the cluster is greater than or equal to the requested amount of RAM, given the overallocation limits on the cluster (block 830). That is, for Cluster1, it may be determined whether the amount of available RAM for allocation (28 GB) is greater than the requested amount of RAM. If not (block 830—NO), processing again proceeds to block 810. Otherwise (block 830—YES), it may determined whether the number of remaining VMs that may be allocated on the cluster is greater than zero (block 835).

For example, resource management device 104-3 may determine the number of remaining VMs on a cluster based on the following expression:

VmsRemaining=Hosts*MaxVmsPerHost−VmsAllocated.

in which the previously allocated VMs for the cluster (retrieved from field 958 in allocated cluster table 950) is subtracted from the product of the number of host servers in the cluster (from fields 934/936 in physical device capabilities table 930) and the maximum number of supported VMs per host server (from field 912 in VM cluster limits table 900). Again using the example of Cluster1 in tables 900, 930, and 950, and assuming the Cluster 1 includes 8 host servers, it can be determined that the remaining (allocatable) VMs on Cluster1 may be calculated as [8 (host servers)*170 (Max VMs per host server)−94 (allocation VMs)]=1360−94=1266 VMs. This indicates that Cluster1 may support the 1266 additional VMs.

If it is determined that the number of remaining VMs that may be allocated on the cluster is not greater than zero (block 835—NO), resource management device 104-3 may again proceed to block 810, the processing of which is described above. However, if it is determined that the number of remaining VMs that may be allocated on the cluster is greater than zero (block 835—YES), e.g., that at least one new VMs may be allocated to the cluster, resource management device 104-3 may determine whether the memory overhead for the requested OS (RAM_OHEAD) is less than or equal to the available overhead memory (AVAIL_OHEAD) on the server (block 840). For example, resource management device 104-3 may retrieve an amount of required overhead RAM from field 978 in RAM overhead table 970 based on the number of CPUs and the amount of RAM received in the build request. This amount of required overhead RAM may be compared to the amount of overhead RAM memory available on the cluster.

If it is determined that the required overhead RAM is greater than the available overhead memory (block 840—

NO), resource management device 104-3 may again proceed to block 810, the processing of which is described above. However, if it is determined that the required overhead RAM is less than the available overhead memory (block 840—YES), e.g., that the cluster has enough available overhead memory to startup the requested VM, resource management device 104-3 may proceed to block 845 and may add the current cluster to the listing of candidate clusters. Resource management device 104-3 may again proceed to block 810, the processing of which is described above.

Figure 10:
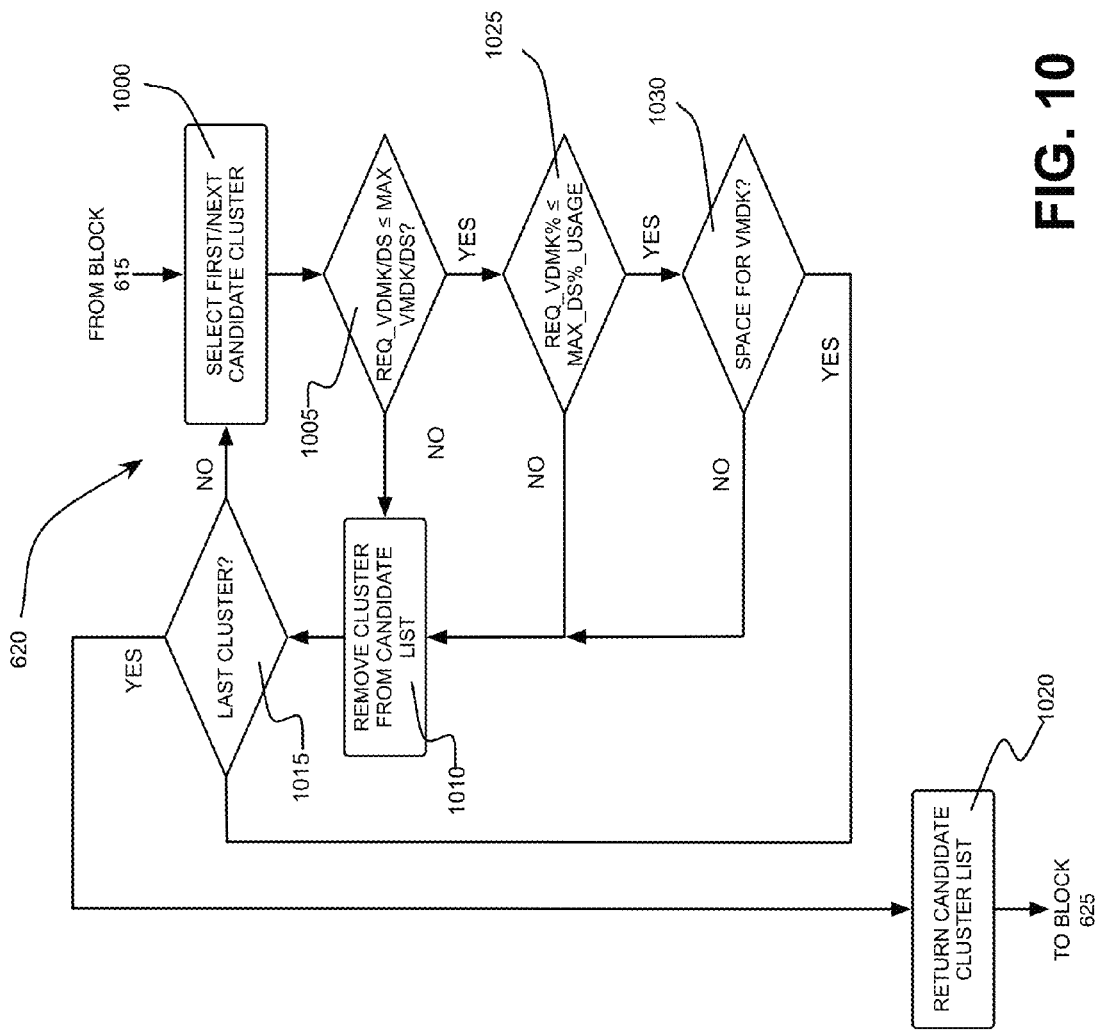
FIG. 10 is a flow diagram of an exemplary process for identifying viable clusters.

FIG. 10 is a flow diagram illustrating an exemplary process for identifying viable clusters based on associated datastores corresponding to block 620 in FIG. 6. The process of FIG. 10 may begin following the identification of candidate clusters performed in block 615 and described above with respect to FIG. 8.

Initially, resource management device 104-3 may select a first/next candidate cluster (block 1000). For example, resource management device 104-3 may retrieve the listing of candidate clusters from block 615 and may select a first cluster from the list. Next, resource management device 104-3 may determine whether the number of VMDKs per datastore on the cluster, including the requested VM, is less than the maximum number of supported VMDKs per datastore for the cluster (block 1005). For example, resource management device 104-3 may retrieve information regarding VMDKs and datatstores associated with the cluster from resource management database 104-2. In other implementations, this information may be obtained from VMM control device 106-2 to ensure that accurate and up-to-date information regarding the clusters are obtained.

If the number of VMDKs per datastore on the cluster, including the requested VM, is not less than the maximum number of supported VMDKs per datastore for the cluster (block 1005—NO), the process continues to block 1010, where the cluster is removed from the list of candidate clusters. Resource management device 104-3 may then proceed to block 1015, where it is determined whether any additional clusters need analyzed for datastore viability. If more clusters remain to be analyzed (block 1015—NO), the process returns to block 1000 for a next available candidate cluster. However, if no additional clusters need analyzed, the listing of remaining candidate clusters is returned in block 1020.

If the number of VMDKs per datastore on the cluster, including the requested VM, is less than the maximum number of supported VMDKs per datastore for the cluster (block 1005—YES), it may be determined whether the calculated datastore usage percentage for the datastores based on the requested VM is less than or equal to the maximum support datastore usage percentage (block 1025). If not (block 1025—NO), the process continues to block 1010, as described above.

However, if the calculated datastore usage percentage for the datastores based on the requested VM is less than or equal to the maximum support datastore usage percentage (block 1025—YES), resource management device 104-3 may determine whether there is sufficient space on the datastores for the cluster to install a VMDK for the requested VM (block 1030). For example, it may be determined whether available CPU capacity equals at least 256 MHz. If not (block 1025—NO), the process continues to block 810, as described above.

However, if there is sufficient space on the datastores for the cluster to install a VMDK for the requested VM (block 1030—YES), the process may proceed to block 1015, described above. The processing of FIG. 10 filters the listing of candidate clusters based on viable datastores, such that only candidate clusters in which 1) the resulting VDMK per datastore is less than the maximum supported VMDK per datastore, 2) the resulting datastore usage percentage is less than a maximum supported datastore usage, and 3) sufficient VMDK space on the datastore is available are passed for optimization ranking.

Figure 11:
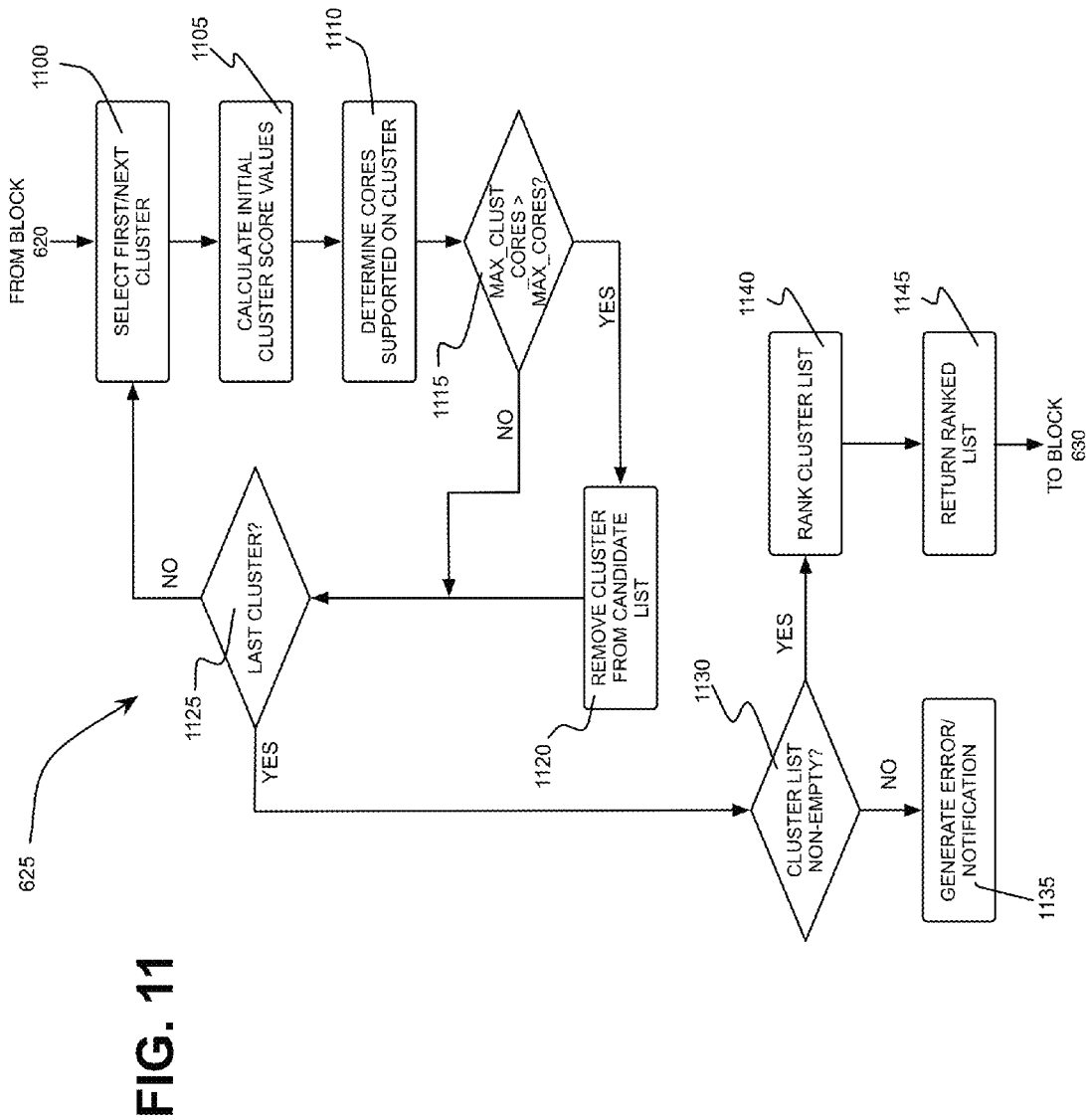
FIG. 11 is a flow diagram of an exemplary process for scoring and ranking viable clusters.

FIG. 11 is a flow diagram illustrating an exemplary process for scoring and ranking viable clusters corresponding to block 625 in FIG. 6. The process of FIG. 11 may begin following the identification of viable candidate clusters performed in block 620 exemplary details of which are described above with respect to FIG. 8.

Initially, resource management device 104-3 may select a first/next candidate cluster (block 1100). For example, resource management device 104-3 may retrieve the listing of remaining candidate clusters from block 620 and may select a first cluster from the list. Next, resource management device 104-3 may calculate a score for the cluster (block 1105). In some implementations, this score may include scores for each of a number of cluster-based metrics, such as 1) the remaining number of VMs that may be created on the cluster, 2) the number of CPU cores remaining on the cluster, 3) the minimum number of cores per host for the cluster, 4) the maximum number of cores on per host in the cluster, and 5) the percentage of RAM on the cluster that is filled.

Next, the maximum number of cores supported on a host server in the cluster is determined (block 1110). In one implementation, this may be determined based on the initial cluster scoring determined in block 1105. It is then determined whether the maximum number of cores per host supported on the cluster is greater than or equal to the maximum number of cores supported by the requested operating system (block 1115). For example, the maximum number of cores supported by the requested OS may be retrieved from field 712 in OS capabilities table 700 and compared to the maximum number of cores per host supported on the cluster. This calculation assists resource management device 104-3 in determining whether a particular cluster is over-qualified for a particular VM. For example, if a build request designates a Windows 2003 server supporting a maximum of 4 GB of RAM, this calculation will determine whether a particular server cluster (e.g., supporting up to 8 GB of RAM per host) is unnecessary.

If the maximum number of cores per host supported on the cluster is greater than the maximum number of cores supported by the requested operating system (block 1115—YES), the cluster is removed from the candidate cluster list (block 1120). In other embodiments, clusters having a max number of cores greater than the max cores supported by the requested operating system are maintained on the list but placed at the end of the list, as less attractive candidates (e.g., following ranking of more suitable clusters in block 1140, described below). In this manner, if no other candidates remain following analysis, the requested VM may be placed on a cluster having a maximum number of cores greater than the max cores supported by the requested operating system. Resource management device 104-3 may then proceed to block 1125, where it is determined whether any additional clusters need analyzed.

If the maximum number of cores per host supported on the cluster is not greater than the maximum number of cores supported by the requested operating system (block 1115—NO), the process continues to block 1125. If more clusters remain to be analyzed (block 1125—NO), the process returns to block 1100 for a next available candidate cluster. However, if no additional clusters need analyzed (block 1125—YES), it may be determined whether the listing of remaining candidate clusters is non-empty, e.g., whether any clusters are available for provisioning the requested VM (block 1130).

If no clusters remain in the candidate list (block 1130—NO), an error or notification may be generated indicated that no clusters are available for provisioning the requested VM. If one or more clusters remain in the candidate list (block 1130—YES) the clusters may be ranked (block 1140). For example, in one implementation, clusters may be ranked based on the RAM fill percentage, such that a candidate cluster having a lower RAM fill percentage is ranked higher than a candidate cluster having a higher RAM fill percentage. In one implementation, if candidate clusters have a same RAM fill percentage, they may be secondarily ranked based on a remaining number of VMs that may be created on the cluster. In this manner, an optimal cluster for hosting the requested VM may be identified. The ranked cluster listing may be returned in block 1145 and processing may proceed to block 630 described above in relation to FIG. 6.

The above specification describes how a system may identify and select an optimal cluster for placement of a requested VM. When a user wishes to create a VM, the user may connect to an integrated provisioning system via a web portal and submit requirements for the VM, such as its operating system, RAM memory, number of virtual CPUs, and its hard disk drive space. Based on the requested parameters and information relating to existing resources allocated in the system, the integrated resource provisioning system retrieves information regarding available resources, previously allocated resources, and various system limitations. Based on this information, the provisioning system identifies viable candidates and scores/ranks the candidates. An optimal candidate is selected for provisioning and the requested VM is provisioned on the optimal candidate. When no viable candidates are available, the provisioning system generates an error or notification information the user of the unavailability.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of acts have been described with respect to FIGS. 6, 8, 10, and 11, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computing-device implemented method comprising:
    receiving a request to provision a virtual machine, wherein the request includes configuration information, wherein the configuration information includes at least a requested amount of random access memory (RAM) and a requested number of central processing unit (CPU) cores;
    identifying, based on the received configuration information, potential resources for hosting the virtual machine, wherein the potential resources comprise a number of clusters that include one or more host devices,
    wherein identifying the potential resources for hosting the virtual machine further comprises:
        determining, for each of the number of clusters:
            whether the amount of RAM in the request is less than or equal to a maximum amount of RAM on each host in the cluster;
            whether a minimum amount of RAM available on each host in the cluster is greater than zero;
            whether a remaining amount of RAM on the cluster is greater than or equal to the requested amount of RAM; and
            whether a required amount of RAM overhead corresponding to the request is less than or equal to an available amount of RAM overhead on the cluster,
            wherein the required amount of RAM overhead corresponding to the request is retrieved from a RAM overhead table that includes a plurality of entries of RAM overhead required for allocation corresponding to a plurality of host configurations with different combinations of numbers of CPU cores and amounts of RAM; and
        adding the cluster to a candidate cluster listing when the amount of RAM in the request is less than or equal to the maximum amount of RAM on each host device in the cluster, the minimum amount of RAM available on each host in the cluster is greater than zero, the remaining amount of RAM on the cluster is greater than or equal to the requested amount of RAM, and the required amount of RAM overhead based on the request is less than or equal to the available amount of RAM overhead on the cluster;
    scoring the candidate clusters in the candidate cluster listing based on the remaining amount of RAM and the available amount of RAM overhead on the candidate clusters;
    ranking the candidate clusters based on the scoring;
    selecting, based on the ranking, an optimal cluster from among the candidate clusters for hosting the requested virtual machine; and
    provisioning the requested virtual machine on the optimal cluster.

2. The method of claim 1, further comprising:
    providing an interface to a user via a network; and
    receiving the request to provision the virtual machine from the user via the interface.

3. The method of claim 2, wherein the interface comprises a graphical interface provided via a web portal, an application programming interface (API), or a command line interface (CLI).

4. The method of claim 2, wherein identifying potential resources for hosting the virtual machine further comprises:
    determining whether no resources are available for hosting the virtual machine; and
    outputting a notification to the user via the interface indicating that no resources are available for the request.

5. The method of claim 1, wherein the request further includes at least an indication of a requested operating system.

6. The method of claim 5, wherein each of the number of clusters are associated with one or more datastores.

7. The method of claim 6, wherein identifying potential resources for hosting the virtual machine further comprises:
    determining, for each of the number of clusters:
        whether the number of CPU cores in the request is less than or equal to a maximum number of CPU cores in the cluster;
    whether a number of remaining virtual machines on the cluster is greater than zero;
        adding the cluster to the candidate cluster listing when the amount of RAM in the request is less than or equal to the maximum amount of RAM on each host in the cluster, the minimum amount of RAM available on each host in the cluster is greater than zero, the remaining amount of RAM on the cluster is greater than or equal to the requested amount of RAM, the number of remaining virtual machines on the cluster is greater than zero, and the required amount of RAM overhead based on the request is less than or equal to the available amount of RAM overhead on the cluster.

8. The method of claim 7, wherein identifying potential resources for hosting the virtual machine further comprises:
    determining, for each cluster in the candidate cluster listing, whether the datastores associated with the cluster can accommodate the requested virtual machine; and
    removing clusters from the candidate cluster listing that can not accommodate the requested virtual machine.

9. The method of claim 8, wherein determining, for each cluster in the candidate cluster listing, whether the datastores associated with the cluster can accommodate the requested virtual machine, further comprises:
    determining whether a number of virtual machine disk files per datastore for the requested virtual machine is less than or equal to a maximum number of virtual machine disk files per datastore for the cluster;
    determining whether a datastore usage percentage for the cluster based on the request is less than a maximum datastore usage percentage allowed on the cluster;
    determining whether CPU capacity exists to execute a virtual machine disk file for the requested virtual machine; and
    removing the cluster from the candidate cluster listing when the number of virtual machine disk files per datastore for the requested virtual machine is not less or equal to the maximum number of virtual machine disk files per datastore for the cluster, the datastore usage percentage for the cluster based on the request is not less the maximum datastore usage percentage allowed on the cluster, or CPU capacity does not exist to execute the virtual machine disk file for the requested virtual machine.

10. The method of claim 7, further comprising:
    determining, for each cluster in the candidate cluster listing, whether a maximum number of supported CPU cores for the cluster is greater than a maximum number of CPU cores for the requested virtual machine; and
    removing clusters from the candidate cluster listing when the maximum number of supported CPU cores for the cluster is greater than a maximum number of CPU cores for the requested virtual machine.

11. The method of claim 10, wherein scoring the potential resources comprises:
    determining, for each of the clusters remaining in the candidate cluster listing, a RAM fill percentage; and
    ranking the clusters remaining on the candidate cluster listing based on the RAM fill percentage.

12. The method of claim 11, wherein scoring the potential resources further comprises:
    determining, for each of the clusters remaining in the candidate cluster listing, a number of virtual machines that may be installed; and
    secondarily ranking the ranked clusters based on the number of virtual machines that may be installed.

13. The method of claim 11, wherein selecting an optimal resource for hosting the requested virtual machine based on the ranking further comprises:
    selecting the highest ranking cluster from the clusters remaining in the candidate cluster listing.

14. The method of claim 1, wherein the maximum amount of RAM on each host in the cluster, the minimum amount of RAM available on each host in the cluster, the remaining amount of RAM on the cluster, the number of remaining virtual machines on the cluster, the required amount of RAM overhead, and the amount of available RAM overhead on the cluster are retrieved from one or more of a resource management database, a data warehouse device, or a virtual machine management control device.

15. The method of claim 1, wherein the remaining amount of RAM on the cluster is based on a total amount of RAM on hosts in the cluster, an overallocation setting associated with the cluster, and an amount of allocated RAM on the cluster.

16. A system comprising:
    a first device comprising:
        a first memory; and
        a first processor,
            wherein the first processor includes at least web portal logic to:
                provide a user interface portal for receiving a request to provision a virtual machine, wherein the request includes configuration information, wherein the configuration information includes at least a requested amount of random access memory (RAM) and a requested number of central processing unit (CPU) cores;
            wherein the user interface portal includes a graphical user interface;
    a second device comprising:
        a second memory; and
        a second processor,
            wherein the second processor includes at least resource management logic to:
                receive the virtual machine provisioning request from the web portal logic, wherein the provisioning request includes at least a requested amount of random access memory (RAM);
                identify, based on the received configuration information, potential resources for hosting the virtual machine;
                determine, for each of the potential resources:
                    whether the amount of RAM in the request is less than or equal to a maximum amount of RAM;
                    whether a minimum amount of RAM available is greater than zero;

whether a remaining amount of RAM is greater than or equal to the requested amount of RAM; and whether a required amount of RAM overhead based on the request is less than or equal to an available amount of RAM overhead, wherein the required amount of RAM overhead corresponding to the request is retrieved from a RAM overhead table that includes a plurality of entries of RAM overhead required for allocation corresponding to a plurality of host configurations with different combinations of numbers of CPU cores and amounts of RAM;

add the potential resource to a candidate resource listing when the amount of RAM in the request is less than or equal to the maximum amount of RAM, the minimum amount of RAM available is greater than zero, the remaining amount of RAM is greater than or equal to the requested amount of RAM, and the required amount of RAM overhead corresponding to the request is less than or equal to the available amount of RAM overhead;

score the resources in the candidate resource listing based on the remaining amount of RAM and the available amount of RAM overhead on the candidate clusters;

rank the resources in the candidate resource listing based on the scores;

select an optimal resource from among the candidate resources, for hosting the requested virtual machine based on the ranking; and queue one or more jobs in a jobs database to provision the requested virtual machine on the optimal resource; and a third device comprising:
a third memory; and
a third processor,
wherein the third processor includes at least workflow engine logic to drive an execution of the jobs in the database, the jobs comprising instructions for one or more of devices in the system to provision the requested virtual machine on the selected optimal resource.

17. The system of claim 16, wherein the potential resources for hosting the virtual machine comprise:
a number of clusters that include one or more host devices, wherein each of the number of clusters are associated with one or more datastores.

18. The system of claim 17, wherein the request to provision a virtual machine further comprises at least an indication of a requested operating system.

19. The system of claim 18, wherein the network management logic is further configured to:
determine whether no clusters are available for hosting the requested virtual machine; and
output an alert message to the user via the graphical user interface when no clusters are available for hosting the requested virtual machine.

20. The system of claim 18, wherein the candidate resource listing comprises a candidate cluster listing, and wherein the network management logic is further configured to, when identifying potential resources for hosting the virtual machine:
determine, for each of the number of clusters, whether the number of CPU cores in the request is less than or equal to a maximum number of CPU cores in the cluster;

determine, for each of the number of clusters, whether the amount of RAM in the request is less than or equal to the maximum amount of RAM on each host in the cluster;

determine, for each of the number of clusters, whether the minimum amount of RAM available on each host in the cluster is greater than zero;

determine, for each of the number of clusters, whether the remaining amount of RAM on the cluster is greater than or equal to the requested amount of RAM;

determine, for each of the number of clusters, whether a number of remaining virtual machines on the cluster is greater than zero; and add the cluster to the candidate cluster listing when the amount of RAM in the request is less than or equal to the maximum amount of RAM on each host in the cluster, the minimum amount of RAM available on each host in the cluster is greater than zero, the remaining amount of RAM on the cluster is greater than or equal to the requested amount of RAM, the number of remaining virtual machines on the cluster is greater than zero, and the required amount of RAM overhead based on the request is less than or equal to the available amount of RAM overhead on the cluster.

21. The system of claim 20, wherein the network management logic is further configured to:
determine, for each cluster in the candidate cluster listing, whether a maximum number of supported CPU cores for the cluster is greater than a maximum number of CPU cores for the requested virtual machine; and
remove clusters from the candidate cluster listing when the maximum number of supported CPU cores for the cluster is greater than a maximum number of CPU cores for the requested virtual machine.

22. The system of claim 21, wherein the network management logic is further configured to, when scoring the potential resources:
determine, for each of the clusters remaining in the candidate cluster listing, a RAM fill percentage;
rank the clusters remaining on the candidate cluster listing based on the RAM fill percentage; and
place the removed clusters at the bottom of the ranked cluster listing.

23. The system of claim 22, wherein the network management logic is further configured to select the highest ranking cluster from the clusters remaining in the candidate cluster listing as the optimal resource for hosting the requested virtual machine.

24. A non-transitory, computer-readable memory device comprising computer executable instructions for causing one or more processors to:
receive a request to provision a virtual machine based on configuration information, wherein the configuration information includes at least a requested amount of random access memory (RAM) and a requested number of central processing unit (CPU) cores;

identify, based on the received configuration information, a number of potential resources for hosting the virtual machine;

determine, for each of the number of potential resources:
whether the amount of RAM in the request is less than or equal to a maximum amount of RAM;
whether a remaining amount of RAM is greater than or equal to the requested amount of RAM; and
whether a required amount of RAM overhead corresponding to the request is less than or equal to an available amount of RAM overhead, wherein the required amount of RAM overhead corresponding to the request is retrieved from a RAM overhead table that includes a plurality of entries of RAM overhead required for allocation corresponding to a plurality of host configurations with different combinations of numbers of CPU cores and amounts of RAM; and add the resource to a candidate resource listing when the amount of RAM in the request is less than or equal to the maximum amount of RAM, the minimum amount of RAM available on each host in the cluster is greater than zero, the remaining amount of RAM is greater than or equal to the requested amount of RAM, and the required amount of RAM overhead based on the request is less than or equal to the available amount of RAM overhead;

score the potential resources in the candidate resource listing based on the remaining amount of RAM and the available amount of RAM overhead on the candidate clusters;

rank the potential resources in the candidate resource listing based on the scores;

select an optimal resource from among the resources in the candidate resource listing for hosting the requested virtual machine based on the ranking; and provision the requested virtual machine using the optimal resource.

\* \* \* \* \*